Oct. 1, 1946.  B. E. MILLS  2,408,438
FILM CLEANING DEVICE
Filed June 18, 1942  5 Sheets-Sheet 2

Oct. 1, 1946.  B. E. MILLS  2,408,438
FILM CLEANING DEVICE
Filed June 18, 1942  5 Sheets-Sheet 3

Inventor.
Bert E. Mills.

Oct. 1, 1946.   B. E. MILLS   2,408,438
FILM CLEANING DEVICE
Filed June 18, 1942   5 Sheets-Sheet 4

Inventor:
Bert E. Mills
By: [signature]
Atty.

Oct. 1, 1946.  B. E. MILLS  2,408,438
FILM CLEANING DEVICE
Filed June 18, 1942   5 Sheets-Sheet 5

Inventor:
Bert E. Mills,
By (signature)
Attorney.

Patented Oct. 1, 1946

2,408,438

UNITED STATES PATENT OFFICE 2,408,438

FILM CLEANING DEVICE

Bert E. Mills, Oak Park, Ill., assignor to Mills Novelty Company, Chicago, Ill., a corporation of Illinois Application June 18, 1942, Serial No. 447,605

10 Claims. (Cl. 15—100)

This invention relates to a device for cleaning motion picture film and is adapted for use as an attachment to a motion picture projector so as to clean the film in the course of its travel from the film coil to the projector lens. It is, however, also adaptable for use at other points or in connection with other film handling apparatus, as, for example, film winding apparatus or means for transferring the film from one reel to another.

The principal object of the invention is to provide a device whereby, a film cleaning solution may be uniformly applied to the film through the medium of film wiping elements and in which the control of said elements and the feeding of the cleaning solution thereto are controlled in such manner as to obtain the desired result with a minimum amount of complication and difficulty.

A further object of the invention is to provide in such a film cleaning device means for causing the device to become inoperative when the supply of cleaning solution becomes exhausted or reaches a predetermined low level in the receptacle from which it is supplied.

A further object of the invention is the provision of means for controlling the movement of the elements of the film wiping device into and out of engagement with the film in coordination with the supply of cleaning solution to said elements so that such solution is supplied only when they are in operative position.

Other objects and advantages of the invention will be apparent from the following description of a preferred embodiment thereof, taken in connection with the accompanying drawings, in which.

Figure 1:
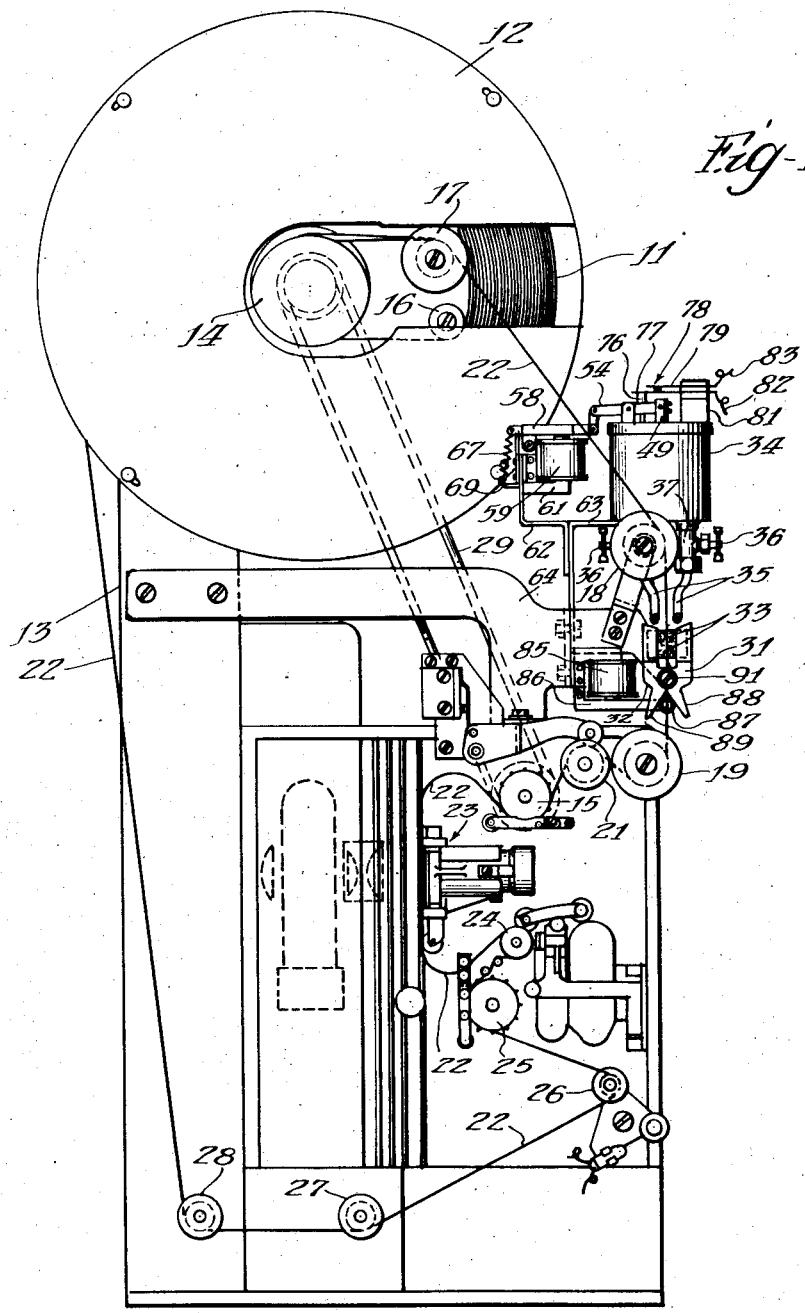
Fig. 1 is a side elevational view of a motion picture projector equipped with the film cleaning device of my invention.
Figure 2:
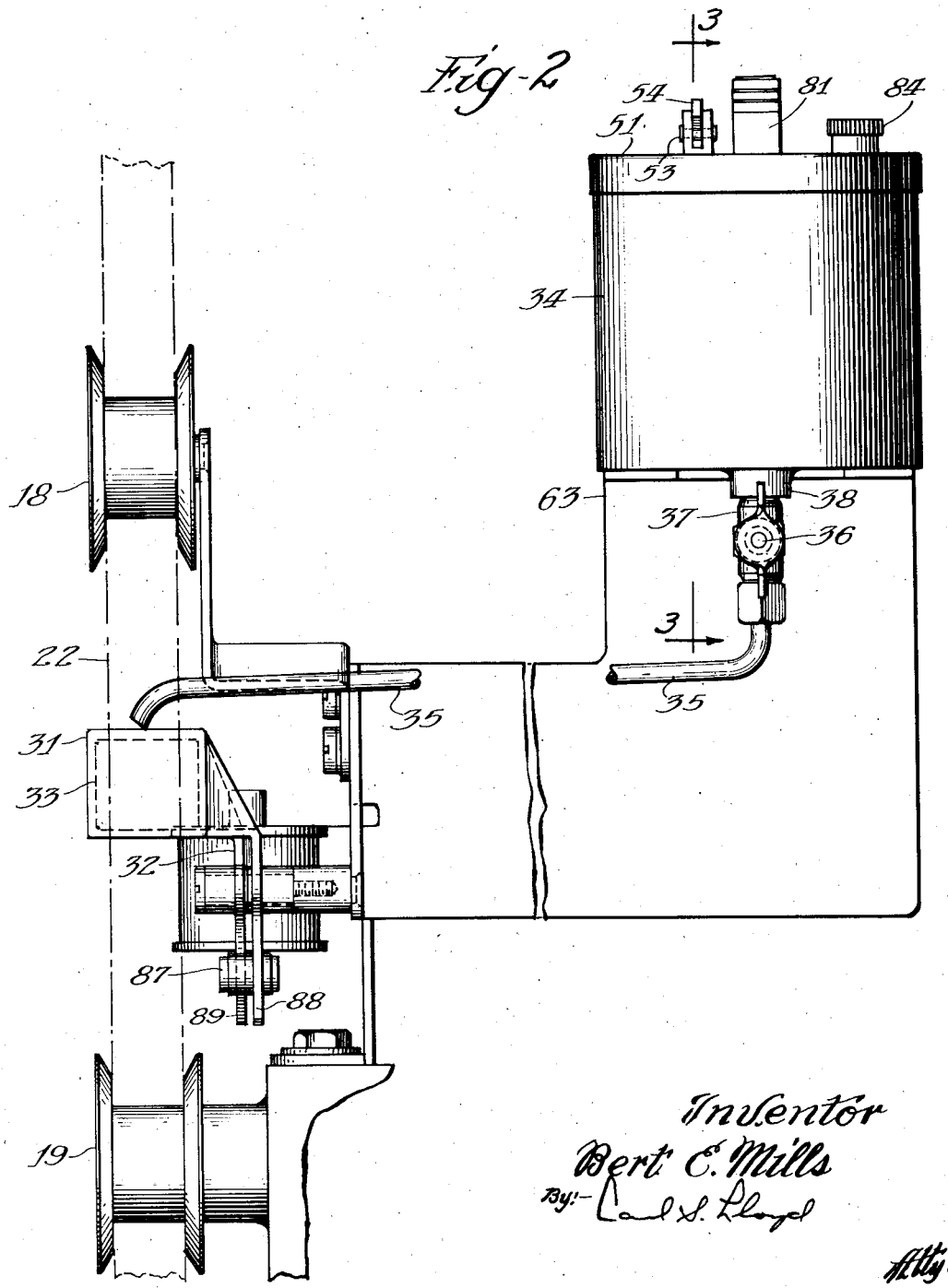
Fig. 2 is an enlarged front view, partly broken away, showing portions of the film cleaning device.

In said drawings the film coil, indicated by the reference numeral 11 is mounted in a film holder 12 supported on a frame 13 of a motion picture projector. The film from the coil is paid out from the center by means of a pay-out roller 14, which preferably is angularly mounted and directs the film into a plane of travel laterally disposed with respect to the film coil 11, in which plane it passes through the projector, being then returned to the exterior of the coil on which it is wound by rotation of the coil. The film is drawn from the inside of the coil by means of a feed sprocket 15 of the projector mechanism and passes around a guide roller 16, the pay-out roller 14, a guide roller 17, and additional guide rollers 18, 19 and 21 to said sprocket 15. The film, which is identified by the numeral 22, then passes through the projector lens mechanism, generally indicated by the numeral 23, and over a sound head roller 24, a second sprocket 25 and rollers 26, 27 and 28 back to the coil 11. The pay-out roller 14 is, or may be, driven by means of a belt 29 from a source of power (not shown) for the sprockets 15 and 25. The projector mechanism is not described in further detail since it is believed that other details thereof are not essential to an understanding of the present invention.

As the film passes between the rollers 18 and 19 it is cleaned by the device of my invention which includes two pivoted wiper elements 31 and 32 which carry pads 33 of felt or like absorbent material adapted to be moved into engagement with opposite sides of the film when the cleaning device is operated, as will be hereinafter described.

Cleaning solution is supplied to said pads from a tank 34 through pipes 35, the rate of flow being regulated so that said solution will drip onto said pads at a desired rate of flow controlled by means of hand-operated valves 36 extending into couplings 37 screwed into bosses 38 on the bottom of the tank 34, said couplings each having staggered passages 39 and 41 therein, with an opening 42 communicably connecting the same, and with the point of the valve member 36 extending into said opening to a variable extent depending upon the position of adjustment of the valve. (See Fig. 3.)

In the bottom of the tank 34 there is provided a plate 43 supported upon a spacer ring 44 to which said plate is tightly secured by means of screws 45. Said ring 44 and plate 43 provide the side and top walls, respectively, of a relatively small chamber 46 which communicates through openings 47 in the bottom of the tank 34 with the passages 39 in the couplings 37.

There is an opening 48 in the plate 43 into which extends the pointed end of a valve member 49 which is disposed vertically through the cover 51 of the tank 34 and through a guide member 52 formed on the top of said plate 43.

The upper end of said valve member 49 is connected by means of a pin 53 with a lever 54 pivoted at 55 to ears 56 on the cover 51, said lever 54 being connected by a link 57 with an armature 58 of an electromagnet 59 carried upon a support 61 on a bracket 62, which is welded or otherwise secured to a bracket 63 on which the tank 34 is supported, the latter bracket being in turn supported upon a frame arm 64.

Figure 3:
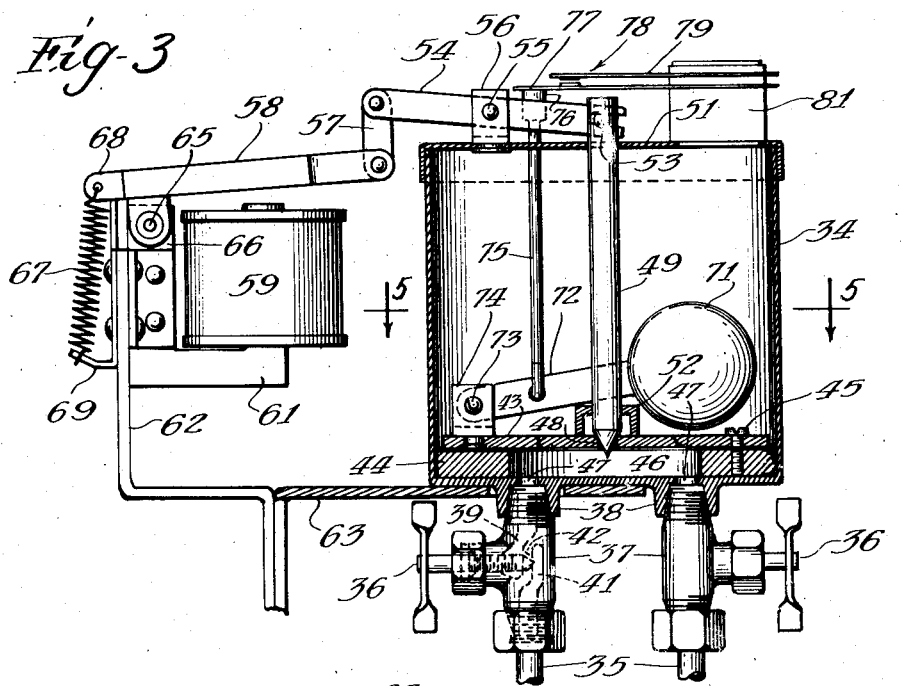
Fig. 3 is a sectional and elevational view of the supply tank for the cleaning solution and the valve mechanism for controlling the flow of solution therefrom, being taken substantially on the line 3—3 in Fig. 2.

The armature 58 is pivoted at 65 to a lug 66 on the bracket 62 and is normally held in the raised position shown in Fig. 3 by means of a spring 67 secured at the upper end to a projection 68 on said armature 58, and at the other end to a lug 69 on the bracket 62.

Figure 4:
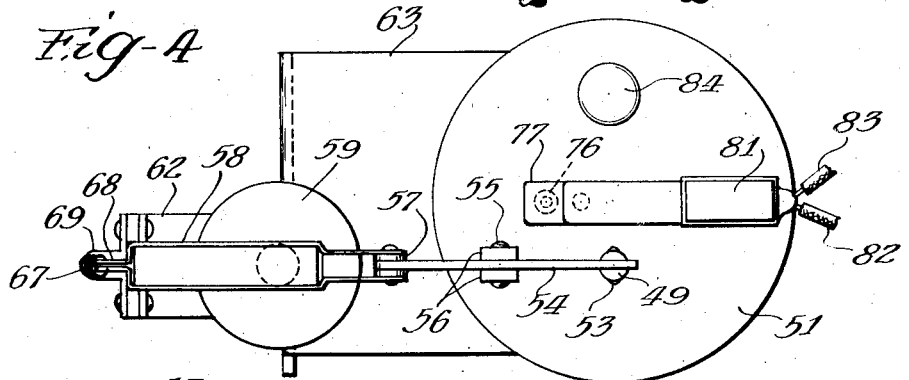
Fig. 4 is a top plan view of the mechanism shown in Fig. 3.
Figure 5:
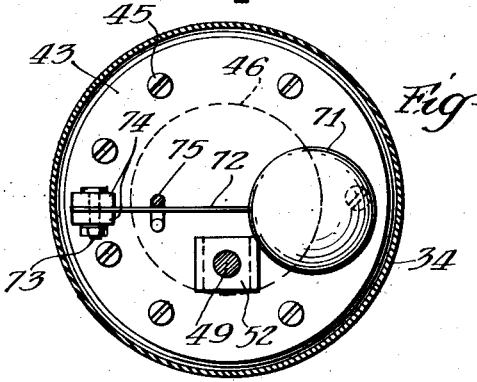
Fig. 5 is a sectional view taken substantially on the section line 5—5 of Fig. 3.
Figure 6:
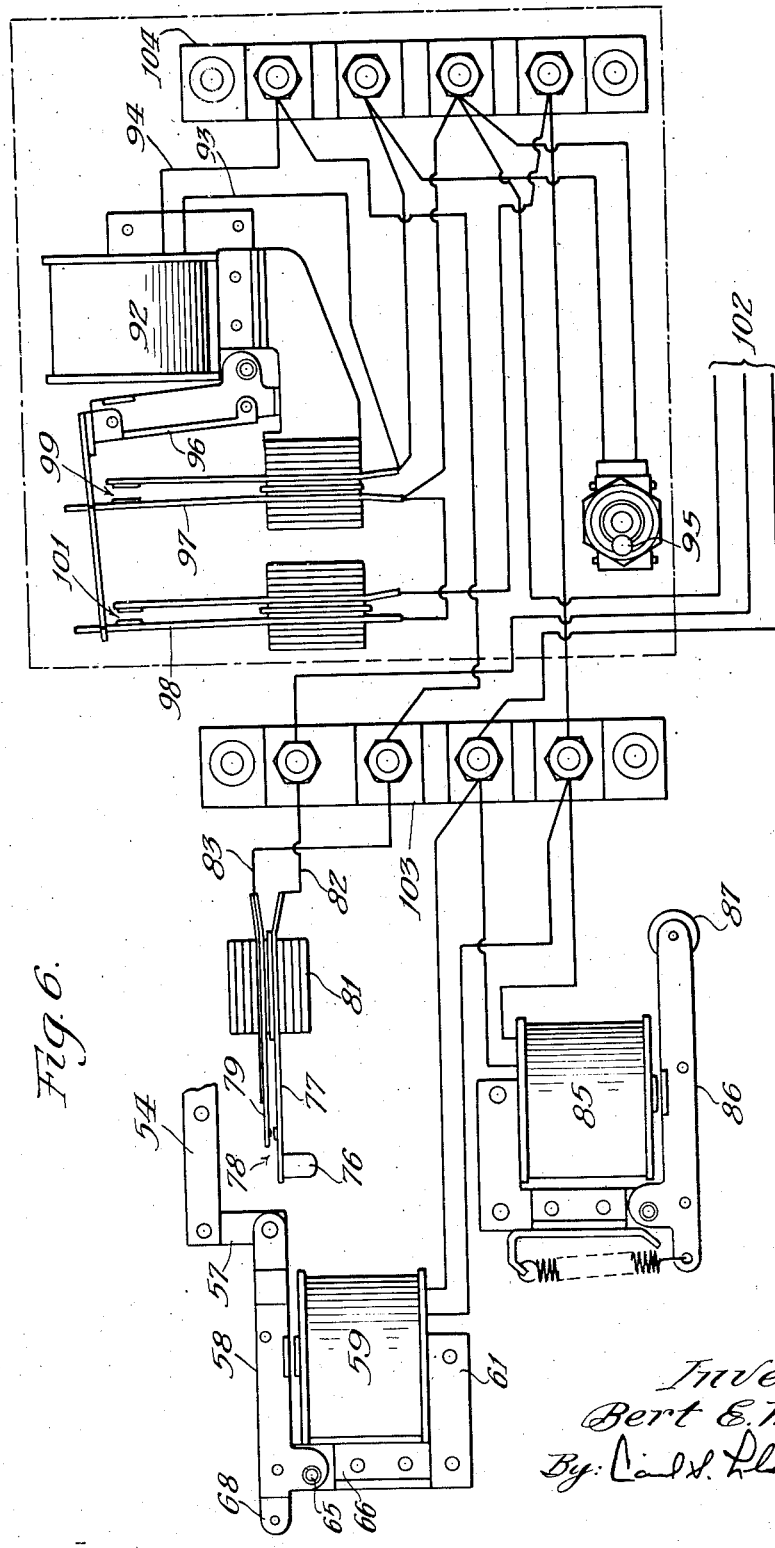
Fig. 6 is a diagrammatic view of certain of the electromagnets and other electrical devices and wiring by which the operation of the device is controlled.

In the tank 34 there is provided a float 71 carried at the end of an arm 72 which is pivoted at 73 to ears 74 on the top of a plate 43. A push rod 75 is secured to said arm 72 intermediate the ends of the latter and extends upwardly through the cover 51, having at its upper end a head 76 engaging a lower spring member 77 of a switch 78. Said member 77 and an upper member 79 of said switch are mounted in vertically spaced relation in a post 81 on said top member 51 of the tank 34, and are connected into an electrical circuit by means of wires 82 and 83 shown in Figs. 1, 4 and 6 of the drawings.

A filler cap 84 is provided on the cover 51, through which a cleaning solution, such, for example, as carbon tetrachloride, may be poured into said tank 34.

A second magnet 85 is supported at the lower end of the bracket 63 and beneath said magnet is a pivoted armature 86 carrying at its outer end a roller 87 disposed between lower extensions 88 and 89 on the arms 31 and 32. Said arms 31 and 32 are spring-biased or weighted so as to normally be in open position with the pads 33 separated, and said extensions 88 and 89 diverge from the pivot 91 on which said arms are mounted so that when the roller 87 moves upwardly between said extensions the upper parts of the members 31 and 32 will be moved toward each other, bringing the pads 33 into contact with the film 22.

A third magnet, identified by the numeral 92 (see Fig. 6), is provided for controlling the energization of the valve magnet 59 and cleaner magnet 85, said magnet 92 being mounted in a conveniently located box (not shown) on the frame of the projector. The circuit, including wires 93 and 94, to said magnet 92 is adapted to be momentarily closed by means of a manually operable switch 95. When energized, said magnet attracts an armature 96 which is connected to movable members 97 and 98 of switches 99 and 101, respectively, both of which are closed by movement of said armature toward the magnet. The switch 99, being in parallel with the switch 95 causes the magnet 92 to remain energized after momentary operation of the switch 95 until the circuit is broken by opening of the switch 78 when the liquid level in the tank 34 falls to a predetermined point.

The connections between the above-described magnets and switches and with the source of power are made through suitably located terminal blocks 103 and 104. The connections to the source of power and to a master relay shown in Fig. 7 are indicated at 102.

Figure 7:
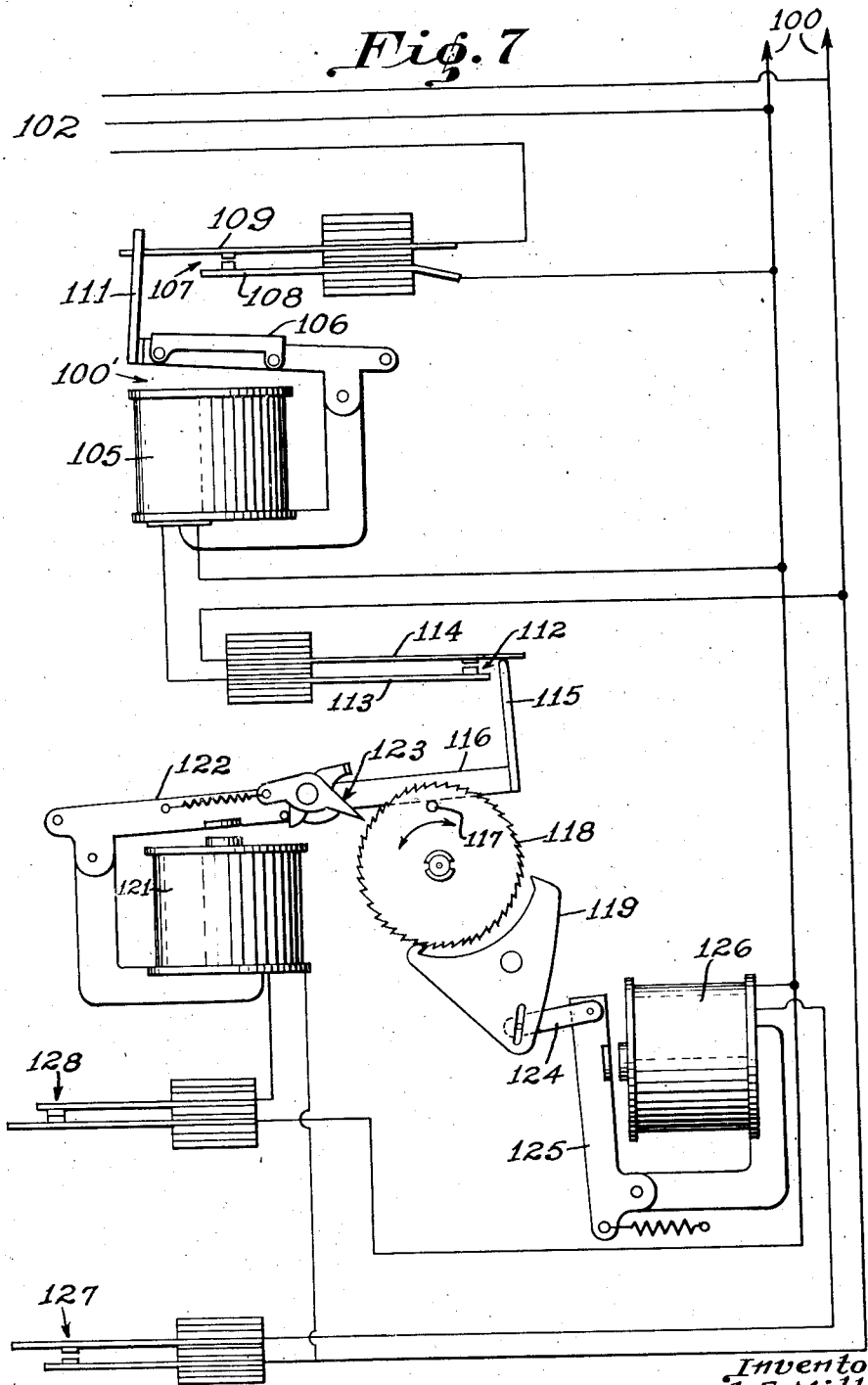
Fig. 7 is a continuation of Fig. 6, showing the master relay and the starting switch, which may be coin-controlled.

In said Fig. 7 I have shown a line connection 100 and a master relay 100'. The latter comprises a magnet 105, an armature 106 which is normally biased to open position, and a switch 107 comprising a fixed member 108 and a movable member 109 which is connected to a projection 111 carried at the end of the armature 106. Thus when the magnet 105 is energized said switch 107 is closed and when it is deenergized the switch is opened.

For controlling said master relay 100' a switch 112 is provided, comprising a fixed member 113 and a movable member 114, the latter being biased to closed position and normally held in open position by a projection 115 on the end of a pivoted lever 116 which rests on a pin 117 on a ratchet wheel 118 of a coin control device of known construction. Said wheel is spring-biased to rotate in clockwise direction and is permitted to move one step in such direction for each coin deposited, such movement being controlled by an escapement lever 119 connected by a link 124 with an armature 125 of a step-up solenoid 126 in circuit with a coin switch 127. Upon the first step the pin 117 moves downwardly a sufficient distance to permit the lever 116 and projection 115 thereon to move far enough away from the switch member 114 to allow the switch 112 to close. A step-back solenoid 121, controlled by a cut-off switch 128 and having an armature 122 carrying a pawl 123, arranged to engage the teeth of the ratchet wheel 118 serves to turn said wheel back one step for each cycle of operation in manner which will be understood by those familiar with coin devices of this general character, and when the pin 117 is restored to its original position the lever 116 and rod 115 will be raised to the point that the switch 112 will be opened, thus terminating the operation of the machine.

The closing of the switch 101, in conjunction with the operation of the master relay 100', causes the magnets 59 and 85 to be energized, thereby opening the valve 48, 49 (Fig. 3) and moving the wiper arms 31 and 32, and the pads 33 carried thereby, into operative relation to the film 22. Drops of cleaning solution are then supplied to the pads 33 and the latter clean the film as the same passes there-between. This condition continues until the master relay opens or the magnet 92 is deenergized by the opening of the switch 78 which is controlled by the liquid level in the tank 34. Thereupon the magnets 59 and 85 are deenergized, with the result that the valve 48, 49 is closed by upward movement of the armature 58 when released by the magnet 59 and the wiping elements are moved to inoperative position in consequence of downward movement of the roller 87 when the armature 86 is released by the magnet 85.

When the tank is refilled to the point that the switch 78 is closed and when the master relay is again energized, the wiping device can again be rendered operative by momentary operation of the switch 95 and the cycle of operation will then be repeated.

The foregoing detailed description has been given for clearness of understanding only, and no unnecessary limitations should be understood therefrom, but the appended claims should be construed as broadly as permissible in view of the prior art.

I claim:

1. A film cleaning device comprising movably mounted wiper elements disposed, respectively, on opposite sides of the film, electrically-controlled actuating mechanism for moving said wiper elements into contact with the film in a course of travel of the latter, said wiper elements being equipped with absorbent contact pads, a supply tank for cleaning solution, an outlet valve for said tank, electromagnetic means for controlling the operation of said valve, means under the control of an operator for causing energization of said electromagnetic means to open said valve, means coordinated with said wiper-actuating mechanism for supplying the cleaning solution from said tank to said absorbent pads with a regulated rate of flow only when said wiper elements are in operative position, and means controlled by the volume of the solution in said tank for causing deenergization of said electromagnetic means and closing of said valve when the quantity of cleaning solution in the tank drops to a predetermined point.

2. A film cleaning device comprising wiper elements movable into contact with the film in a course of travel of the latter and equipped with absorbent contact pads, a supply tank for cleaning solution, an outlet valve for said tank, electromagnetic means for controlling the operation of said valve, means under the control of an operator for causing energization of said electromagnetic means to open said valve, means for conducting the cleaning solution from said tank to said absorbent pads with a regulated rate of flow, and means arranged to be automatically operated after predetermined operation of the device to cause deenergization of said electromagnetic means and closing of said valve.

3. A film cleaning device comprising wiper elements movable into contact with the film in a course of travel of the latter and equipped with absorbent contact pads, a supply tank for cleaning solution, an outlet valve for said tank, electromagnetic means for controlling the operation of said valve, means under the control of an operator for causing energization of said electromagnetic means to open said valve, means for conducting the cleaning solution from said tank to said absorbent pads with a regulated rate of flow, and means arranged to be automatically operated after predetermined operation of the device to cause deenergization of said electromagnet means and closing of said valve and to cause said movable wiper elements to move out of film-engaging position.

4. A film cleaning device comprising wiper elements movable into contact with the film in a course of travel of the latter, a supply tank for cleaning solution, an outlet valve for said tank, electromagnetic means for controlling the operation of said valve, means under the control of an operator for causing energization of said electromagnetic means to open said valve, means for conducting the cleaning solution from said tank to said wiper elements with a regulated rate of flow, and means arranged to be automatically operated after predetermined operation of the device to cause deenergization of said electromagnetic means and closing of said valve.

5. A film cleaning device comprising wiper elements engageable with the film in a course of travel of the latter, means for supplying a cleaning solution to said wiper elements, electromagnetic means for controlling the movement of said wiper elements into and out of operative position, electromagnetic means for controlling the supply of said cleaning solution to said wiper elements, and means for controlling both said electromagnetic means to cause the same to be energized and deenergized simultaneously, whereby cleaning solution is supplied to said wiper elements only when the latter are in film-engaging position.

6. A film cleaning device comprising wiper elements engageable with the film in a course of travel of the latter, means for supplying a cleaning solution to said wiper elements, electromagnetic means for controlling the movement of said wiper elements into and out of operative position, electromagnetic means for controlling the supply of said cleaning solution to said wiper elements, and means, including a control magnet, for causing simultaneous energization of both said electromagnetic means at the beginning of a period of operation to move said wiper elements into contact with the film and to cause feeding of said cleaning solution to said elements, deenergization of said control magnet causing simultaneous deenergization of both said electromagnetic means to cause movement of said wiper elements out of film-engaging position and to cut off the flow of cleaning solution thereto.

7. A film cleaning device comprising wiper elements engageable with the film in a course of travel of the latter, means for supplying a cleaning solution to said wiper elements, electromagnetic means for controlling the movement of said wiper elements into and out of operative position, electromagnetic means for controlling the supply of said cleaning solution to said wiper elements, means, including a control magnet, for causing simultaneous energization of both said electromagnetic means at the beginning of a period of operation to move said wiper elements into contact with the film and to cause feeding of said cleaning solution to said elements, deenergization of said control magnet causing simultaneous deenergization of both said electromagnetic means to cause movement of said wiper elements out of film-engaging position and to cut off the flow of cleaning solution thereto, said means for supplying cleaning solution including a supply tank, and means controlled by the volume of cleaning solution in said tank for causing deenergization of said control magnet when said volume falls to a predetermined point.

8. A film cleaning device comprising wiper elements engageable with the film in a course of travel thereof, means for supplying cleaning solution to said wiper elements, and electrically-operated control devices for moving the wiper elements into and out of engagement with the film and for causing the feeding of cleaning solution to said wiper elements only when they are in film-engaging position.

9. In a motion picture projector, a film cleaning device comprising wiper elements engageable with the film in the course of travel thereof from the film coil to the projector lens, a supply tank from which cleaning solution may be supplied to said wiper elements, an outlet valve in said tank, and electrically-operated means for controlling operation of said film wiper elements and said outlet valve, whereby the valve is opened substantially simultaneously with movement of said wiper elements into film-engaging position.

10. In a motion picture projector, a film cleaning device comprising wipers movable into and out of engagement with the film in the course of travel thereof, control means including a manually operable starting element and power-operable, electrically-controlled mechanism responsive to actuation of said starting element for moving said wipers into film-engaging position and, after a predetermined film-cleaning operation, causing disengagement thereof from the film.

BERT E. MILLS.